US012791077B1

(12) United States Patent
Hurd et al.

(10) Patent No.: US 12,791,077 B1
(45) Date of Patent: Nov. 10, 2026

(54) VIBRATION DAMPER SYSTEMS

(71) Applicants: ThyssenKrupp Bilstein of America Inc., Hamilton, OH (US); thyssenkrupp AG, Essen (DE)

(72) Inventors: Joseph Hurd, Liberty Township, OH (US); Austin Vibbard, Hamilton, OH (US); Jayson Moore, Cincinnati, OH (US)

(73) Assignees: ThyssenKrupp Bilstein of America Inc., Hamilton, OH (US); thyssenkrupp AG, Essen (DE)

( * ) Notice: Subject to any disclaimer, the term of this patent is extended or adjusted under 35 U.S.C. 154(b) by 8 days.

(21) Appl. No.: 19/219,766

(22) Filed: May 27, 2025

(51) Int. Cl.
*B60G 13/08* (2006.01)
*B60G 15/12* (2006.01)
*F16F 9/34* (2006.01)

(52) U.S. Cl.
CPC ................ *F16F 9/34* (2013.01); *B60G 13/08* (2013.01); *B60G 15/12* (2013.01);
(Continued)

(58) Field of Classification Search
CPC ....... B60G 11/00; B60G 11/26; B60G 11/265; B60G 11/27; B60G 11/30; B60G 13/02; B60G 13/06; B60G 13/08; B60G 13/10; B60G 13/14; B60G 15/00; B60G 15/02; B60G 15/12; B60G 2202/10; B60G 2202/15; B60G 2202/152; B60G 2202/1524; B60G 2202/154; B60G 2202/20; B60G 2202/24; B60G 2202/242;
(Continued)

(56) References Cited

U.S. PATENT DOCUMENTS 4,899,853 A * 2/1990 Hummel ................ B60G 15/12 188/269
5,123,671 A * 6/1992 Driessen .............. B60G 17/018 188/266.8
(Continued)

FOREIGN PATENT DOCUMENTS

DE 102008015412 B4 10/2009
DE 102015112180 A1 2/2017
(Continued)

*Primary Examiner* — Daniel M. Keck
(74) *Attorney, Agent, or Firm* — thyssenkrupp North America, LLC

(57) ABSTRACT

A hydrostrut includes a damper tube filled at least partially with a damping liquid, a hollow piston rod configured to move longitudinally in the damper tube, a working piston that is attached to the hollow piston rod, and first and second damping valves, wherein each of the first and second damping valves is configured to provide an independently-adjustable damping force, wherein the damping liquid passes through the first damping valve when the hollow piston rod moves into the damper tube and the damping liquid passes through the second damping valve when the hollow piston rod moves longitudinally out of the damper tube, wherein each of the first and second damping valves comprises a valve body that is movable between a closed position and an open position to set a throughflow cross section of the respective damping valve, wherein each valve body is independently positionable by an independently-controllable drive device.

14 Claims, 6 Drawing Sheets

(52) U.S. Cl.
CPC .. *B60G 2202/152* (2013.01); *B60G 2202/242* (2013.01); *B60G 2202/42* (2013.01); *F16F 2222/12* (2013.01)

(58) Field of Classification Search
CPC .......... B60G 2202/30; B60G 2202/314; B60G 2202/32; B60G 2202/322; B60G 2202/40; B60G 2202/42; B60G 2202/422; B60G 2202/44; F16F 9/00; F16F 9/32; F16F 9/34; F16F 2222/12
USPC ...................................................... 280/124.16
See application file for complete search history.

(56) References Cited

U.S. PATENT DOCUMENTS

| | | | | |
|---|---|---|---|---|
| 5,788,031 | A * | 8/1998 | Saito | F16F 9/46<br>188/315 |
| 5,797,594 | A * | 8/1998 | Sekine | F16F 9/36<br>188/315 |
| 6,152,432 | A * | 11/2000 | Perrin | F16F 9/02<br>188/297 |
| 10,487,902 | B2 * | 11/2019 | Schmidt | F16F 9/18 |
| 10,557,512 | B2 * | 2/2020 | Förster | F16F 9/325 |
| 11,635,122 | B2 * | 4/2023 | Deferme | F16F 9/46<br>188/266.2 |
| 11,661,993 | B2 * | 5/2023 | Hovén | F16F 9/46<br>188/299.1 |
| 12,066,076 | B2 * | 8/2024 | Gross | F16F 9/325 |
| 2003/0001346 | A1 * | 1/2003 | Hamilton | F16F 9/466<br>280/5.515 |
| 2003/0127294 | A1 * | 7/2003 | Moradmand | F16F 9/466<br>188/282.5 |
| 2004/0020730 | A1 * | 2/2004 | Turner | F16F 9/46<br>188/322.13 |
| 2009/0260902 | A1 * | 10/2009 | Holman | F16F 9/063<br>180/6.7 |
| 2009/0283706 | A1 * | 11/2009 | Schmidt | F16F 9/466<br>251/129.01 |
| 2010/0116608 | A1 * | 5/2010 | Runkel | F16F 9/064<br>188/314 |
| 2010/0219569 | A1 * | 9/2010 | Mori | B62K 25/08<br>267/127 |
| 2010/0244340 | A1 * | 9/2010 | Wootten | B60G 15/12<br>188/313 |
| 2011/0042174 | A1 * | 2/2011 | Hamers | F16F 9/464<br>188/322.13 |
| 2012/0193849 | A1 * | 8/2012 | Runkel | F16F 9/06<br>267/217 |
| 2012/0305350 | A1 * | 12/2012 | Ericksen | B62K 25/06<br>188/269 |
| 2015/0211594 | A1 * | 7/2015 | Parizek | F16H 7/08<br>267/121 |
| 2018/0010666 | A1 * | 1/2018 | Marking | B60G 17/08 |
| 2020/0231245 | A1 * | 7/2020 | Lynch | B62K 25/286 |
| 2023/0080108 | A1 * | 3/2023 | Timoney | B60G 13/16<br>280/5.515 |
| 2023/0250811 | A1 * | 8/2023 | Tucker | F16F 9/185<br>290/1 R |
| 2023/0311610 | A1 * | 10/2023 | Stabenow | B60G 11/30<br>267/64.28 |
| 2025/0229589 | A1 * | 7/2025 | Ellifson | B60G 15/062 |

FOREIGN PATENT DOCUMENTS

| | | | |
|---|---|---|---|
| EP | 1538366 | B1 | 6/2005 |
| EP | 2103834 | B1 | 9/2009 |
| EP | 2108857 | B1 | 10/2009 |

* cited by examiner

VIBRATION DAMPER SYSTEMS

FIELD

The present disclosure generally relates to vibration damper systems for motor vehicles and to corresponding methods of using such vibration damper systems.

BACKGROUND

Vibration dampers may comprise a damper tube which is filled with damping liquid (which may also be referred to as a hydraulic liquid), a piston rod which can retract (as the damper is compressed) and rebound (as the damper is extended) in the damper tube, a working piston which is attached to the piston rod and divides the interior space of the damper tube into a piston rod-side working space and a working space remote from the piston rod, and first and second damping valves, each configured to provide an independently-adjustable damping force. The first damping valve is passed through by the damping liquid in the case of a compression phase of movement, and the second damping valve is passed through by the damping liquid in the case of a rebound phase of movement of the piston rod. The damping force of the two damping valves can be set by independent electrically-controllable drive devices. Each damping valve may comprise a valve body which can be moved in a defined manner between a closed position and an open position using the drive device. The valve bodies may be loaded into closed position(s) and/or open position(s) by respective restoring forces.

In some embodiments, in a currentless, inactivated state, the valve bodies of the damping valves are situated in either a closed position or an open position based on loading by the restoring forces. As a consequence, the damping valves are either what are known as "normally closed" valves (NC valves) or what are known as "normally open" valves (NO valves). In general, NC valves of this type have a high energy consumption since energy is consumed continuously in order to achieve at least partial opening of the valve during normal operation. In general, NO valves of this type have a lower energy consumption during normal operation than NC valves. NO valves are generally less suitable for setting emergency running properties, however, since, in the currentless, inactive state, the damping liquid can flow through the valve in a largely unimpeded manner, and a soft performance characteristic is therefore provided.

SUMMARY

A hydrostrut may be summarized as comprising: a damper tube filled at least partially with a damping liquid; a hollow piston rod configured to move longitudinally in the damper tube; a working piston that is attached to the hollow piston rod; and first and second damping valves, wherein each of the first and second damping valves is configured to provide an independently-adjustable damping force, wherein the damping liquid passes through the first damping valve when the hollow piston rod moves into the damper tube and the damping liquid passes through the second damping valve when the hollow piston rod moves longitudinally out of the damper tube, wherein each of the first and second damping valves comprises a valve body that is movable between a closed position and an open position to set a throughflow cross section of the respective damping valve, wherein each valve body is independently positionable by an independently-controllable drive device.

The first and second damping valves may be electromagnetically-operable, continuously-adjustable damping valves. The first and second damping valves may be arranged in a piggyback valve housing. The piggyback valve housing may have a flat, milled flange and screw holes through which screws can extend to couple the piggyback valve housing to the damper tube. The hydrostrut may further comprise a first working space inside the hollow piston rod, a second working space outside of and adjacent to the hollow piston rod in a longitudinal direction, wherein the second working space is hydraulically coupled with the first working space directly through the working piston, and a third working space outside of and adjacent to the hollow piston rod in a radial direction, wherein the third working space is hydraulically coupled with the second working space directly through the first and second damping valves.

Movement of the hollow piston rod into the damper tube may cause the damping liquid to flow from the second working space toward the first damping valve and movement of the hollow piston rod out of the damper tube may cause the damping liquid to flow from the third working space toward the second damping valve. The hydrostrut may further comprise an air spring. The air spring may include compressed nitrogen gas within a fourth working space inside the hollow piston rod. The fourth working space may be separated from the first working space by a dividing piston. The dividing piston may be configured to translate longitudinally along the length of the hollow piston rod such that the dividing piston travels toward the fourth working space when the hollow piston rod moves longitudinally into the damper tube, thereby compressing the gas in the fourth working space, and such that the dividing piston travels toward the first working space when the hollow piston rod moves out of the damper tube, thereby expanding the gas in the fourth working space.

A vibration damper for a motor vehicle may be summarized as comprising: a damper tube filled at least partially with damping liquid; a piston rod that is configured to move longitudinally in the damper tube; a working piston that is attached to the piston rod; and first, second, third, and fourth adjustable damping valves, wherein each of the adjustable damping valves is configured to provide an independently-adjustable damping force, wherein the damping liquid passes through the first and second adjustable damping valves when the piston rod moves longitudinally into the damper tube and the damping liquid passes through the third and fourth adjustable damping valves when the piston rod moves longitudinally out of the damper tube, wherein each of the adjustable damping valves comprises a valve body that is movable between a closed position and an open position to set a throughflow cross section of the respective damping valve, wherein each valve body is independently positionable by an independently-controllable drive device.

The vibration damper may further comprise: first and second passive, non-adjustable damping valves configured such that the damping liquid can pass through the first passive damping valve when the piston rod moves longitudinally into the damper tube and the damping liquid can pass through the second passive damping valve when the piston rod moves longitudinally out of the damper tube. The damper tube, the piston rod, and the working piston may be arranged along a first common axis, the first and third adjustable damping valves may be arranged along a second common axis, the second and fourth adjustable damping valves may be arranged along a third common axis, and the first and second passive damping valves may be arranged along a fourth common axis, wherein the first, second, third, and fourth common axes are parallel to and spaced apart from one another. The second, third, and fourth common longitudinal axes may all be aligned in a first common plane. The first and fourth common longitudinal axes may be arranged in a second common plane that is perpendicular to the first common plane. The first and second passive damping valves may provide relatively hard performance characteristics relative to the first, second, third, and fourth adjustable damping valves.

A motor vehicle may be summarized as comprising: a first hydrostrut, including: a first damper tube filled at least partially with a first damping liquid; a first hollow piston rod configured to move longitudinally in the first damper tube; a first working piston that is attached to the first hollow piston rod; first and second damping valves, wherein each of the first and second damping valves is configured to provide an independently-adjustable damping force, wherein the first damping liquid passes through the first damping valve when the first hollow piston rod moves longitudinally into the first damper tube and the first damping liquid passes through the second damping valve when the first hollow piston rod moves longitudinally out of the first damper tube, wherein each of the first and second damping valves comprises a respective valve body that is movable between a closed position and an open position to set a throughflow cross section of the respective damping valve, wherein each valve body is independently positionable by an independently-controllable drive device; and a first air spring including compressed nitrogen gas within a working space inside the first hollow piston rod; and a second hydrostrut, including: a second damper tube filled at least partially with a second damping liquid; a second hollow piston rod configured to move longitudinally in the second damper tube; a second working piston that is attached to the second hollow piston rod; third and fourth damping valves, wherein each of the third and fourth damping valves is configured to provide an independently-adjustable damping force, wherein the second damping liquid passes through the third damping valve when the second hollow piston rod moves longitudinally into the second damper tube and the second damping liquid passes through the fourth damping valve when the second hollow piston rod moves longitudinally out of the second damper tube, wherein each of the third and fourth damping valves comprises a respective valve body that is movable between a closed position and an open position to set a throughflow cross section of the respective damping valve, wherein each valve body is independently positionable by an independently-controllable drive device; and a second air spring including compressed nitrogen gas within a working space inside the second hollow piston rod.

The compressed nitrogen gas within the working space inside the first hollow piston rod may be fluidically coupled with the compressed nitrogen gas within the working space inside the second hollow piston rod. The compressed nitrogen within the working spaces inside the first and second hollow piston rods may be fluidically coupled to a compressor. The compressed nitrogen within the working spaces inside the first and second hollow piston rods may be fluidically coupled to an accumulator.

DETAILED DESCRIPTION

Figure 1:
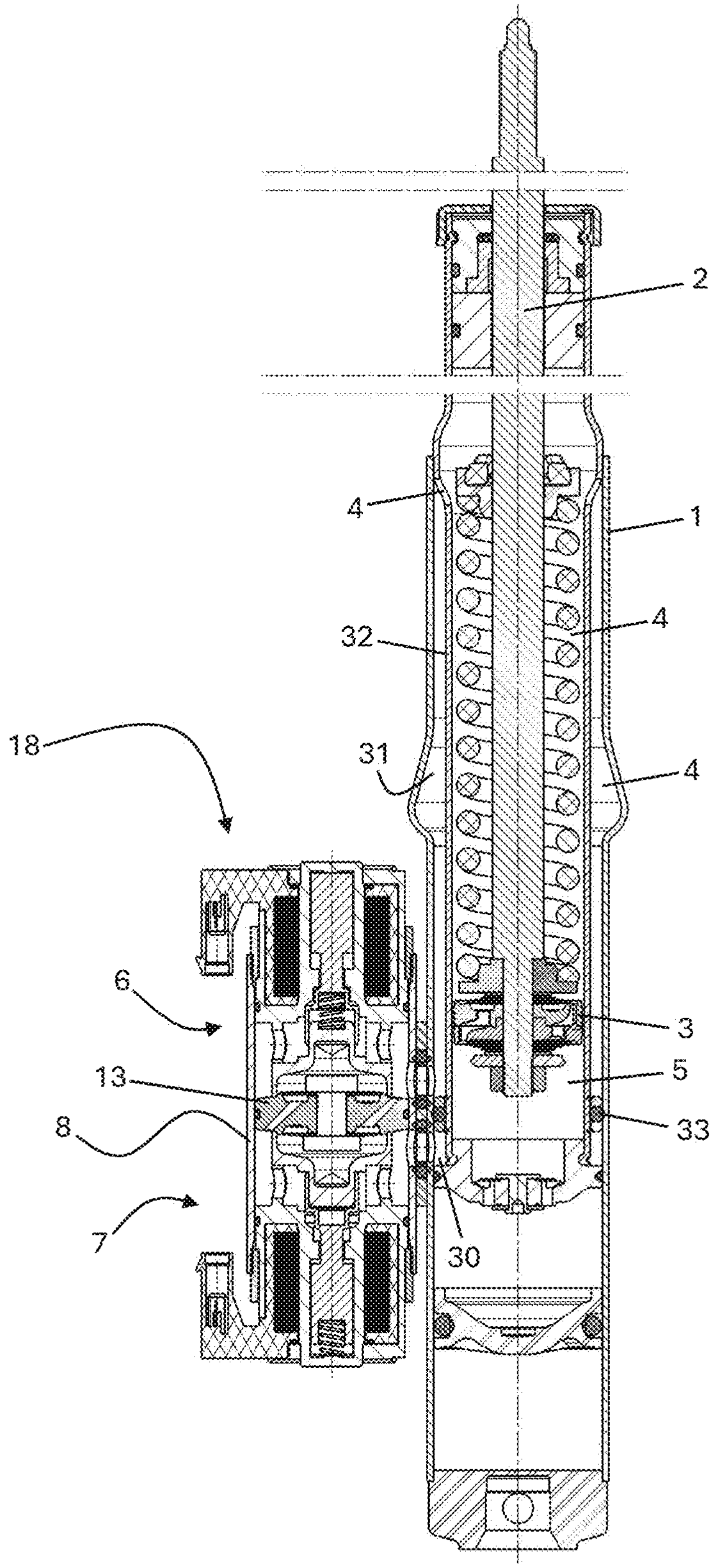
FIG. 1 is a sectional view of an example vibration damper.

Although certain example methods and apparatus are described herein, the scope of coverage of this disclosure is not limited thereto. On the contrary, this disclosure covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some embodiments, a vibration damper includes a first restoring mechanism arranged in such a way that it loads a first valve body into its open position, and a second restoring mechanism arranged in such a way that it loads a second valve body into its closed position. In some embodiments, a vibration damper comprises a damper tube which is filled at least partially with damping liquid (which may also be referred to as a hydraulic liquid), a piston rod which can retract (as the damper is compressed) and rebound (as the damper is extended) in the damper tube, a working piston which is attached to the piston rod and divides an interior space of the damper tube into a first working space and a second working space, and a first and a second damping valve each configured to provide an independently-adjustable damping force.

The first damping valve is passed through by the damping liquid in the case of a compression phase of movement, and the second damping valve is passed through by the damping liquid in the case of a rebound phase of movement of the piston rod. Each damping valve comprises a valve body which is moved in a defined manner between a closed position and an open position, as a result of which a throughflow cross section of the respective damping valve is set in a targeted manner. In some embodiments, a method comprises targeted setting of the position of each valve body by way of a separate, independently-controllable drive device, and loading of the valve bodies in each case by way of a restoring mechanism counter to the actuating force of the drive device. In some embodiments, a first restoring mechanism loads a first valve body into its open position, and a second restoring mechanism loads a second valve body into its closed position.

Some embodiments include configuring one of the damping valves as an NC valve and the other as an NO valve. It has been shown that it can be sufficient for emergency running properties if a hard characteristic is produced merely in one of the rebound or compression stages. In the case of a correspondingly hard characteristic, the corresponding (e.g., vertical) vehicle movement can already be damped to a sufficiently hard extent in one of the stages, in such a way that a hard characteristic can be dispensed with in the other stage. For the other stage, the more energy-efficient NO valve can then be used, as a result of which the damping valve overall is more energy-efficient.

In some embodiments, the damping valves are electro-magnetically operable, continuously adjustable actuating valves. In some embodiments, the damping valves described herein are main damping valves of a vibration damper. The main damping valves can be arranged in the piston, in particular in the case of monotube dampers, or can be a constituent part of a piggyback valve.

Main damping valves of this type are generally arranged, in particular, in the main volumetric flow of the damping liquid. Since the main volumetric flow is considerably greater in most operating states than, for example, a volumetric flow, by way of which merely a pilot control pressure is set, valves of this type consume a comparatively great amount of energy. Therefore, the requirement for energy saving is particularly high in the case of vibration dampers of this type. A flow of damping liquid through the main damping valve, which flows from one working space into the other working space on account of the piston movement and in the process, in particular in the operating state at high piston speed, makes up the greatest proportion of the flowing fluid and is called the main volumetric flow. In contrast to this, a volumetric flow through a pilot control valve does not fall under the designation of main volumetric flow.

It is particularly advantageous if the NC valve is arranged in the damping valve which is passed through by the main volumetric flow in the rebound stage. This is because the characteristics of the rebound stage as a rule have greater spreads than the characteristics of the compression stage. Therefore, a hard characteristic can be set in the rebound stage for the emergency running case, and can therefore damp the vehicle in a considerably harder manner solely by way of the hard characteristic in the rebound stage.

The two end positions of the damping valve are called the open and the closed position, a throughflow cross section through the damping valve being greater in the open position than in the closed position. An absolute seal in the closed position may be provided, but is not necessarily required. In the case of a compression phase of movement of the piston rod (compression stage), the piston rod is dipped further into the damper tube, and the working piston is moved in the process in the direction of the working space which is remote from the piston rod. In the case of a rebound phase of movement of the piston rod (rebound stage), sections of the piston rod are pulled out of the damper tube, and the working piston is moved in the direction of the piston rod-side working space.

FIG. 1 shows a vibration damper with a piggyback valve 18 which is attached to a damper tube 1. A piston rod 2 is held in the damper tube 1 such that it can move longitudinally relative to the damper tube 1 in compression and rebound phases of movement. A working piston 3 is attached to one end of the piston rod 2, which working piston 3 divides the damper tube interior space into a piston rod-side working space 4 and a working space 5 which is remote from the piston rod. The working piston 3 includes main damping valves such that, during operation of the vibration damper and as the working piston 3 moves through the damper tube 1, damping liquid is forced to flow through the main damping valves of the working piston 3, such as by deflecting valve discs thereof. As the damping liquid flows through the main damping valves of the working piston 3, such flow is highly controlled such that viscosity, friction, and/or other effects provide resistance to movement of the piston rod 2 and piston 3 relative to the damper tube 1 and convert kinetic energy of the piston rod 2 and piston 3 into heat in the damping liquid, which is then dissipated to the environment through the damper tube 1.

Figure 2:
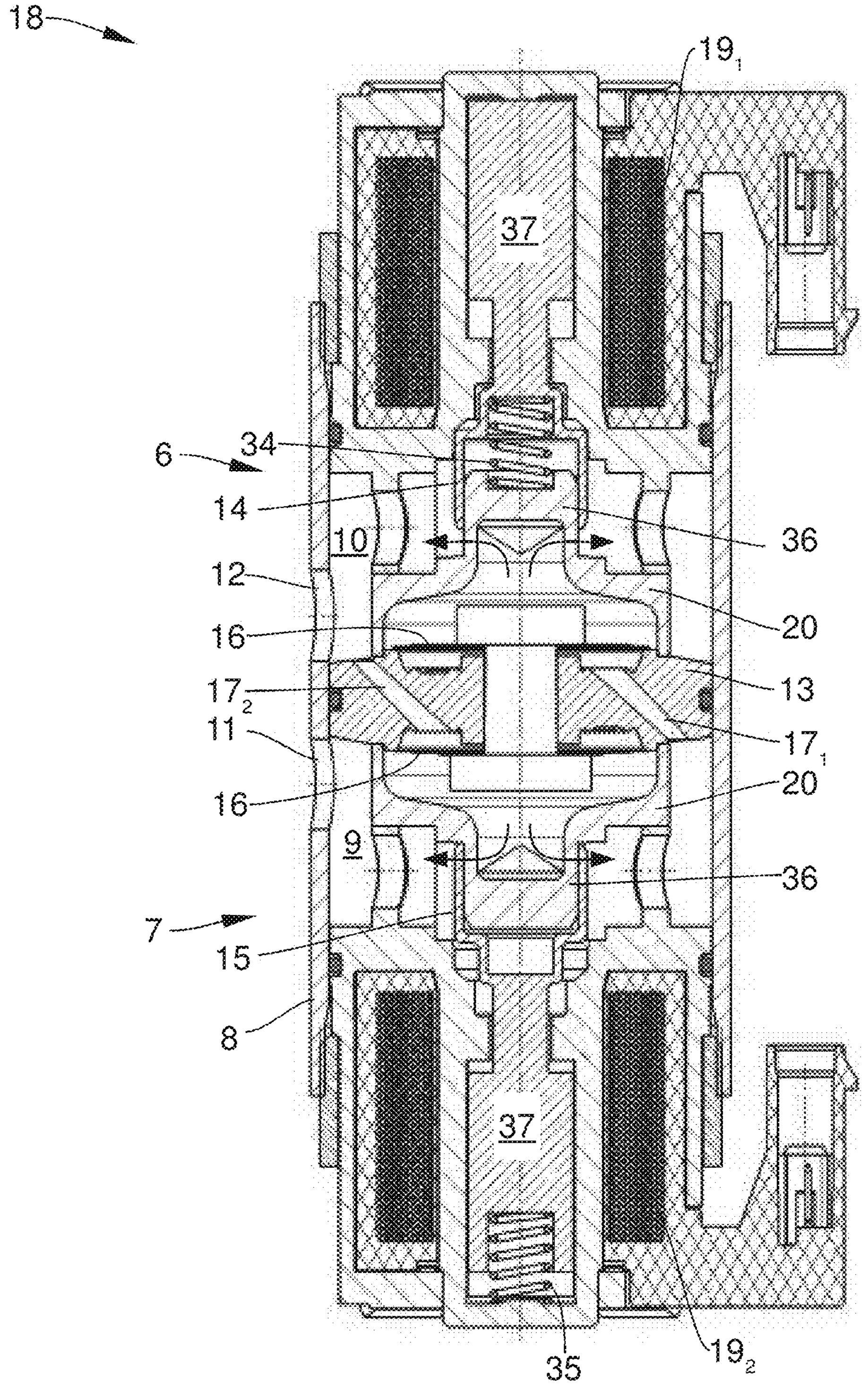
FIG. 2 is a sectional view of an example piggyback valve of the vibration damper of FIG. 1.

The piggyback valve 18 has a housing 8, in which two independently- and continuously-adjustable main damping valves 6, 7 are arranged. The main damping valves 6, 7 are arranged such that, during operation of the vibration damper and as the working piston 3 moves through the damper tube 1, damping liquid can be forced to flow through the main damping valves 6, 7, such as by deflecting valve discs thereof. As the damping liquid flows through the main damping valves 6, 7, such flow is highly controlled such that viscosity, friction, and/or other effects provide resistance to movement of the piston rod 2 and piston 3 relative to the damper tube 1 and convert kinetic energy of the piston rod 2 and piston 3 into heat in the damping liquid, which is then dissipated to the environment, such as through the housing 8. Via the main damping valves 6, 7, the damping force of the vibration damper can be set for the rebound stage and the compression stage independently of one another. The main damping valves 6, 7 and the further construction of the piggyback valve 18 are indicated merely by way of example in the illustration of FIG. 1. FIG. 2 discloses additional details of the piggyback valve 18.

The feeding of the damping liquid to the main damping valves 6, 7 takes place via a first flow feed line 30 in the case of a compression phase of movement of the piston rod 2 and via a second flow feed line 31 in the case of a rebound phase of movement of the piston rod 2. The flow feed lines 30, 31 are formed by way of a separating tube 32 which is inserted into the damper tube 1, and are sealed with respect to one another via a seal element 33. FIG. 2 shows an axial section of the piggyback valve 18 of the vibration damper according to FIG. 1, in which the housing 8 is of cylindrical configuration. The housing 8 has two connector bores 11, 12, via which in each case one hydraulic space 9, 10 of the piggyback valve 18 is connected to one of the two working spaces 4, 5. A dividing wall 13 which separates the two hydraulic spaces 9, 10 from one another is provided between the two hydraulic spaces 9, 10.

The two main damping valves 6, 7 are arranged in the housing 8. The first main damping valve 6 is arranged above the dividing wall 13 in the illustration according to FIG. 2, whereas the second main damping valve 7 is arranged below the dividing wall 13 in the illustration according to FIG. 2. The first and the second main damping valves 6, 7 in each case comprise a first and a second valve body 14, 15 which interacts with a cylindrical part of a deflection element 36, through which flow can pass. One or more throttle openings are provided in the shell of the cylindrical part of the deflection element 36, which throttle openings can either be closed completely, covered partially or opened completely by way of the hollow-cylindrical part of the valve body 14, 15, depending on which axial position the associated valve body 14, 15 assumes. For this purpose, each valve body 14, 15 can be displaced in an infinitely variable manner between an open position, in which it opens the throttle openings, and a closed position, in which it closes the throttle openings.

If the throttle openings are closed completely by way of the valve body 14, 15, the respective main damping valve 6, 7 cannot be passed through by the damping liquid. In this case, the damping force of the vibration damper has to be generated via the damping force generation devices of the working piston 3. If, in contrast, the throttle openings are opened completely or partially by the valve body 14, 15, a damping force is generated during the throughflow of the throttle openings. The smaller the throughflow cross section of the throttle openings, the greater the damping force which is generated.

In order for it to be possible to displace the valve body 14, 15 axially, a separate electromagnetic drive device such as a solenoid 19 is provided for each of the valve bodies 14, 15, which drive device 19 can continuously adjust an armature 37 of the respective valve body 14, 15 over a predefined adjusting travel. In this way, every desired throughflow cross section of the throttle openings and therefore every desired damping force can be set.

In the case of a compression phase of movement of the piston rod 2 (compression stage), that is to say if the piston rod 2 dips into the damper tube 1, the working piston 3 presses damping liquid out of the working space 5 which is remote from the piston rod via the bore 11 into the first hydraulic space 9. The damping liquid flows from the first hydraulic space 9 through a first channel 171 in the dividing wall 13. The damping liquid is fed via the first channel 171 to a passive damping element 16 of the first main damping valve 6, which damping element 16 generates a damping force which is dependent on the flow speed of the damping liquid, and additionally acts as a one-way valve. The damping liquid flows via the passive damping element 16 into the deflection element 36 of the first main damping valve 6. The flow is deflected radially to the outside in the cylindrical part of the deflection element 36, on which the hollow-cylindrical part of the first valve body 14 is guided axially. Here, the damping liquid flows through the throughflow cross section of the throttle openings which is opened by the first valve body 14, and enters into the second hydraulic space 10. The damping liquid then flows out of the second hydraulic space 10 through the second bore 12 into the piston rod-side working space 4. In FIG. 2, arrows are intended to indicate the approximate path of the flow in the region of the throttle openings.

In the case of a rebound phase of movement of the piston rod 2 (rebound stage), the working piston 3 presses damping liquid out of the piston rod-side working space 4 through the bore 12 into the second hydraulic space 10. The damping liquid flows from the second hydraulic space 10 through a second channel 172 of the dividing wall 13. The damping liquid is fed via the second channel 172 to a passive damping element 16 of the second main damping valve 7, which damping element 16 generates a damping force which is dependent on the flow speed of the damping liquid. The damping liquid flows via the passive damping element 16 into the deflection element 36 of the second main damping valve 7. The flow is deflected radially to the outside in the cylindrical part of the deflection element 36, on which the hollow-cylindrical part of the second valve body 15 is guided axially. Here, the damping liquid flows through the throughflow cross section of the throttle openings which is opened by the second valve body 15, and enters into the first hydraulic space 9. The damping liquid then flows out of the first hydraulic space 9 through the first bore 11 into the working space 5 which is remote from the piston rod. The arrows are also intended to indicate the approximate path of the flow in the region of the throttle openings here.

The dividing wall 13 separates the two hydraulic spaces 9, 10 from one another hydraulically, and ensures a correct central inflow of the damping valves 6, 7 with the channels 171, 172. The two valve bodies 14, 15 are loaded in each case by way of a first and second restoring spring 34, 35 which counteract the respective drive device 19. The first restoring spring 34 is arranged in such a way that it loads the first valve body 14 into its open position. The drive device

191, e.g., a solenoid, which belongs to the first damping valve 6 counteracts the first restoring spring 34 and loads the first valve body 14 into its closed position depending on the actuation. As a consequence, the first main damping valve is an NO valve which is open in the currentless, inactivated state (normally open=NO). The second restoring spring 35 is arranged in such a way that it loads the second valve body 15 into its closed position. The drive device 192, e.g., a solenoid, which belongs to the second damping valve 7 counteracts the second restoring spring 35 and loads the second valve body 15 into its open position depending on the actuation. As a consequence, the second main damping valve 7 is a valve which is closed in the currentless, inactivated state (normally closed=NC).

In this embodiment, the NC valve is assigned to the rebound stage. Since the characteristics of the rebound stage as a rule have greater spreads, a hard characteristic can be set for the emergency running case here, and can therefore damp the vehicle in a considerably harder manner solely by way of the hard characteristic in the rebound stage. A correspondingly swapped embodiment, namely where the second restoring spring 35 is arranged in such a way as to load the second valve body 15 into its open position, and the first restoring spring 34 is arranged in such a way as to load the first valve body 14 into its closed position, is nevertheless possible. Furthermore, in some embodiments, a vibration damper can be provided in which both the first restoring spring 34 and the second restoring spring 35 load the respective valve bodies into their respective open positions, or in which both the first restoring spring 34 and the second restoring spring 35 load the respective valve bodies into their respective closed positions.

Figure 3:
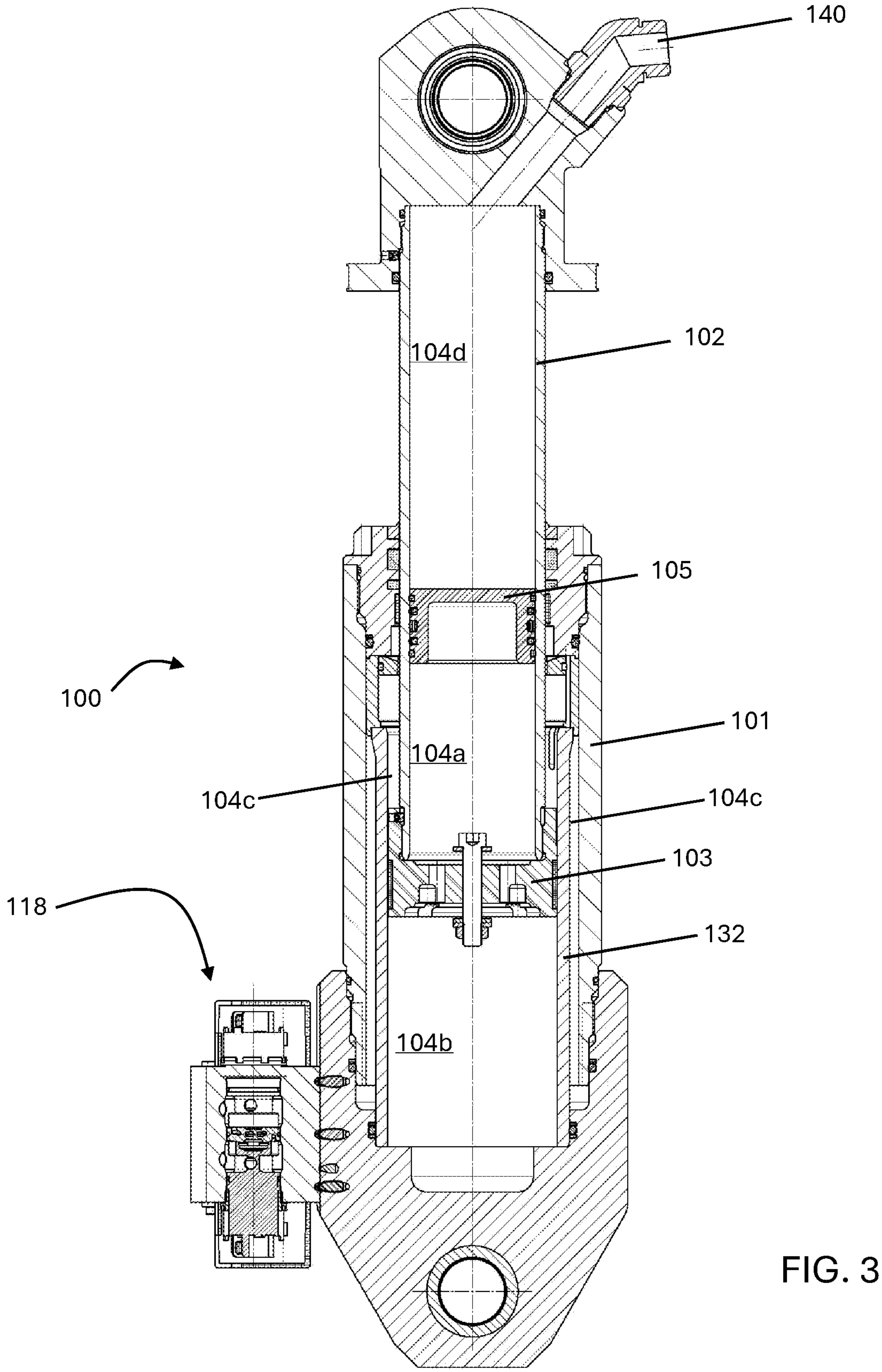
FIG. 3 is a first cross-sectional view of another vibration damper.
Figure 4:
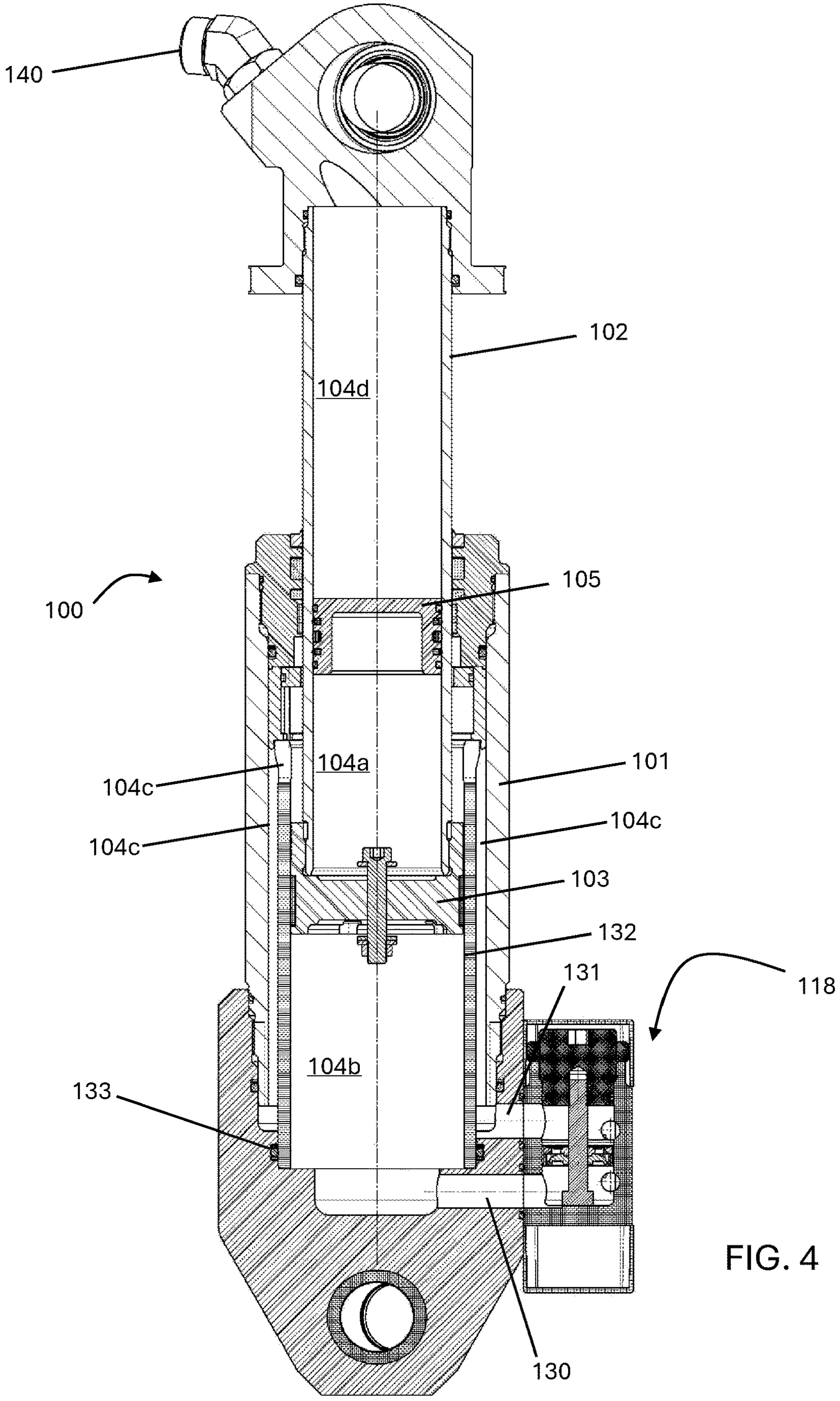
FIG. 4 is a second cross-sectional view of the vibration damper of FIG. 3.

FIG. 3 shows a first cross-sectional view of another vibration damper 100, such as for use in a motor vehicle, including an outer damper tube 101 and a piggyback valve 118 attached to the outer damper tube 101. FIG. 4 shows a second cross-sectional view of the vibration damper 100. In general, the vibration damper 100 can include and incorporate features described herein for the vibration damper illustrated in FIGS. 1 and 2, and the various features of the vibration dampers described herein can be combined with one another. As used herein, the term “piggyback valve” generally refers to valving components arranged radially outside of the outer damper tube 101. For example, the piggyback valve 118 may have a flat, milled valve flange facing toward the damper tube 101 or other components coupled thereto, such that a secure and sealed connection can be formed, either directly or indirectly, between the piggyback valve 118 and the damper tube 101, such as by screws extending through screw holes 142.

As illustrated in FIGS. 3 and 4, a piston rod 102 is held in the damper tube 101 such that it can move longitudinally with respect to the damper tube 101. A working piston 103 is attached to one end of the piston rod 102, which working piston 103 divides the damper tube interior space into a first working space **104*a*, a second working space 104*b*, and a third working space 104*c*. As described with respect to the vibration damper of FIGS. 1 and 2, the working piston 103 includes main damping valves such that, during operation of the vibration damper 100 and as the working piston 103 moves through the damper tube 101, damping liquid is forced to flow through the main damping valves of the working piston 103, such as by deflecting valve discs thereof. As the damping liquid flows through the main damping valves of the working piston 103, such flow is highly controlled such that viscosity, friction, and/or other effects provide resistance to movement of the piston rod 102** and piston 103 relative to the damper tube 101 and convert kinetic energy of the piston rod 102 and piston 103 into heat in the damping liquid, which is then dissipated to the environment through the damper tube 101.

As illustrated, the first working space 104*a* is inside the piston rod 102. The second working space 104*b* is outside of and adjacent to the piston rod 102 in a longitudinal direction, is separated from the first working space 104*a* by the piston 103, and is configured to exchange damping liquid with the first working space 104*a* directly through the piston 103, such as through conduits and valves arranged therein. The third working space 104*c* is outside of and adjacent to the piston rod 102 in a radial direction, is separated from the first working space 104*a* by the piston rod 102 and to some extent by a separating tube 132, and is configured to exchange damping liquid with the second working space 104*b* directly through the piggyback valve 118, such as through conduits and valves arranged therein, as described elsewhere herein. Thus, the third working space 104*c* is configured to exchange damping liquid with the first working space 104*a* only indirectly, such as through the second working space 104*b*. As further illustrated in FIGS. 3 and 4, the third working space 104*c* is separated from the second working space 104*b* both in a radial direction, by the separating tube 132, and in a longitudinal direction, by the piston 103.

Figure 5:
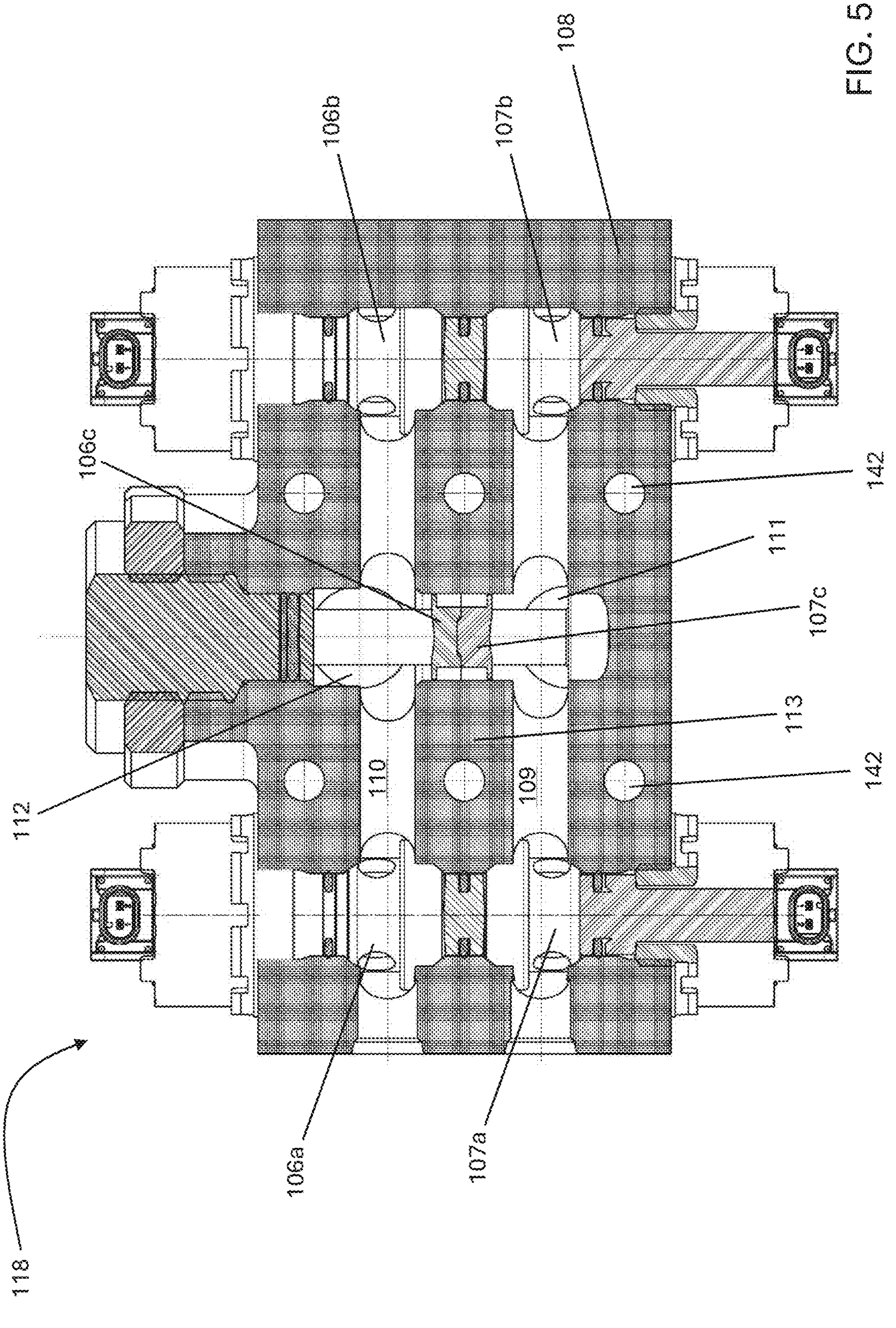
FIG. 5 is a cross-sectional view of a piggyback valve of the vibration damper of FIGS. 3 and 4.
Figure 6:
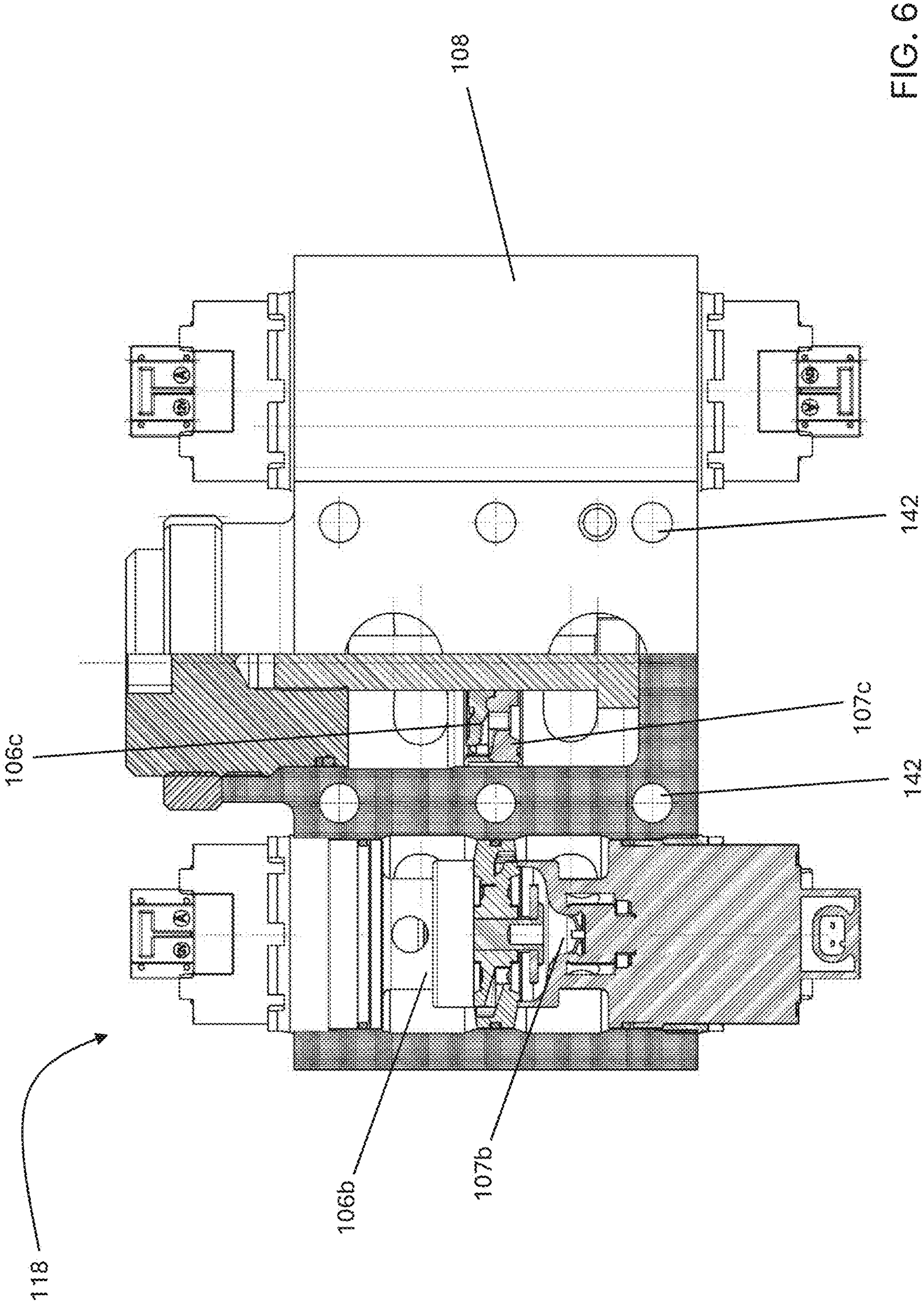
FIG. 6 is a cutaway view of the piggyback valve of FIG. 5.

The piggyback valve 118 has a housing 108, in which four independently- and continuously-adjustable main damping valves 106*a*, 106*b*, 107*a*, and 107*b*, as well as two passive, non-adjustable main damping valves 106*c* and 107*c*, which may function as check valves, are arranged. Via the main damping valves 106*a*, 106*b*, and 106*c* (referred to herein collectively as main damping valves 106), as well as main damping valves 107*a*, 107*b*, and 107*c* (referred to herein collectively as main damping valves 107), the damping force of the vibration damper 100 can be set for the rebound stage and the compression stage independently of one another. The main damping valves 106 and 107 and the further construction of the piggyback valve 118 are indicated merely by way of example in the illustration of FIGS. 3 and 4. FIGS. 5 and 6 disclose additional details of the piggyback valve 118.

The main damping valves 106 and 107 are arranged such that, during operation of the vibration damper 100 and as the working piston 103 moves through the damper tube 101, damping liquid can be forced to flow through the main damping valves 106 and 107, such as by deflecting valve discs thereof. As the damping liquid flows through the main damping valves 106 and 107, such flow is highly controlled such that viscosity, friction, and/or other effects provide resistance to movement of the piston rod 102 and piston 103 relative to the damper tube 101 and convert kinetic energy of the piston rod 102 and piston 103 into heat in the damping liquid, which is then dissipated to the environment, such as through the housing 108.

The feeding of the damping liquid to the main damping valves 106 and 107 takes place from the second working space 104*b* via a first flow feed line 130 in the case of a compression phase of movement of the piston rod 102 and from the third working space 104*c* via a second flow feed line 131 in the case of a rebound phase of movement of the piston rod 102. The flow feed lines 130 and/or 131 may be formed at least in part by the separating tube 132 which is inserted into the damper tube 101 and which at least partially separates the first, second, and third working spaces from one another, and may be sealed with respect to one another via an annular seal element 133. FIG. 5 shows a cross-sectional view of the piggyback valve 118 of the vibration damper 100 looking from the piggyback valve 118 toward the damper tube 101 and FIG. 6 shows a cutaway view thereof looking from the damper tube 101 toward the piggyback valve 118. As illustrated in FIGS. 5 and 6, the housing 108 has two connector bores 111, 112, via which in each case one hydraulic space 109, 110 of the piggyback valve 118 is connected, via the flow feed lines 130 and 131, to one of the two working spaces 104*b*, 104*c*. A dividing wall 113 which separates the two hydraulic spaces 109, 110 from one another is provided between the two hydraulic spaces 109, 110.

As illustrated in FIGS. 3 and 4, in contrast to the vibration damper illustrated in FIGS. 1 and 2, the piston rod 102 of the vibration damper 100 is hollow. For example, the vibration damper 100 may be what is known as a "hydrostrut." In particular, the vibration damper illustrated in FIGS. 1 and 2 may be combined with other external components, such as a coil spring, to form a larger damper system, shock absorber system, or suspension system. Such embodiments are typically more suitable for relatively light-duty vehicles, such as passenger vehicles and even consumer-oriented trucks and/or SUVs. In contrast, the vibration damper 100 may be a hydrostrut, which is an integrated hydro-pneumatic suspension system that combines the structure and functionality of a vibration damper (which may be hydraulic, that is, functions using a damping liquid as described herein) with a spring (which may be pneumatic, that is, functions using a gas, for example, as an air spring) into a single, compact unit.

Hydrostruts, and the vibration damper 100, are typically much larger than consumer-oriented vibration dampers and the vibration damper illustrated in FIGS. 1 and 2. In particular, hydrostruts are typically much longer, much wider (have much larger diameters), and have components (e.g., tubes) having much larger wall thicknesses. They are generally more expensive and better suited to extremely heavy-duty vehicles, including heavy duty trucks and other wheeled vehicles, and construction, forestry, and/or military vehicles. Thus, design considerations are typically much different for hydrostruts than for other, relatively light-duty (e.g., automotive) dampers. For example, they are typically designed to endure higher loads, provide greater durability, and offer enhanced performance to ensure vehicle stability and crew comfort in challenging terrains and situations.

As illustrated in FIGS. 3 and 4, the piston rod 102 of the vibration damper 100 is hollow and houses an upper separating or dividing piston 105. In particular, the dividing piston 105 separates the first working space 104*a* within the piston rod 102 from a fourth working space 104*d*. As described herein, the first working space 104*a* may be filled with a damping liquid. Further, the fourth working space 104*d* may be filled with a damping gas, such as a high-pressure nitrogen (N2) gas. The dividing piston 105 is mounted within the piston rod 102 such that it seals the first working space 104*a* from the fourth working space 104*d*, and also such that it is configured to translate longitudinally along the length of the piston rod 102 (that is, up-and-down as illustrated in FIGS. 3 and 4). Thus, during operation of the vibration damper 100, the dividing piston 105 travels toward the fourth working space 104*d* (upward as illustrated in FIGS. 3 and 4) when the piston rod 102 moves longitudinally into the damper tube 101 (that is, during retraction or compression), thereby compressing (increasing the pressure of) the gas in the fourth working space 104*d*. Furthermore, during operation of the vibration damper 100, the dividing piston 105 travels toward the first working space 104*a*

(downward as illustrated in FIGS. 3 and 4) when the piston rod 102 moves longitudinally out of the damper tube 101 (that is, during extension or rebound), thereby expanding or decompressing (reducing the pressure of) the gas in the fourth working space 104*d*.

As further illustrated in FIGS. 3 and 4, the vibration damper 100 includes a pneumatic port 140, by which the high-pressure gas within the fourth working space 104*d* can be coupled to other pneumatic components. For example, the fourth working space 104*d* can be charged with high-pressure gas (e.g., nitrogen gas, N2) through the pneumatic port 140, and/or the high-pressure gas can be discharged through the pneumatic port 140. In some embodiments, plural vibration dampers 100 may be installed on a wheeled vehicle, such as one at each wheel or set of wheels. Thus, there may be four, six, eight, or more of the vibration dampers 100 installed on a single wheeled vehicle. In such cases, the respective fourth working spaces 104*d* of each of the vibration dampers 100 may be coupled to one another through their respective pneumatic ports 140. Furthermore, operation of the vibration damper 100 may be controlled by other components, including computer systems, or by human operators of the wheeled vehicles. In some embodiments, the respective fourth working spaces 104*d* of each of the vibration dampers 100 may also be coupled to other pneumatic components, such as a pneumatic compressor, pneumatic accumulator, etc., such that the pressure of the high pressure gas in the fourth working spaces 104*d* can be dynamically controlled.

FIGS. 5 and 6 illustrate additional details of the piggyback valve 118. As illustrated in FIGS. 5 and 6, the piggyback valve 118 includes a housing 108 that houses the continuously-adjustable main damping valves 106*a*, 106*b*, 107*a*, and 107*b*, each of which can include structural features and function as described herein with respect to the main damping valves 6 and 7 illustrated in FIGS. 1 and 2. As further illustrated in FIGS. 5 and 6, the piggyback valve 118 includes the two passive, non-adjustable main damping valves 106*c* and 107*c* housed within the housing 108. The main damping valve 106*a* is arranged above the dividing wall 113 in the illustration according to FIGS. 5 and 6, whereas the main damping valve 107*a* is arranged below the dividing wall 113 and directly below the main damping valve 106*a* in the illustration according to FIGS. 5 and 6. The main damping valves 106*a*, 107*a* in each case comprise respective valve bodies corresponding to valve bodies 14 and 15 described with respect to FIGS. 1 and 2, which interact with respective cylindrical parts of deflection elements corresponding to deflection elements 36 described with respect to FIGS. 1 and 2.

Similarly, the main damping valve 106*b* is arranged above the dividing wall 113 in the illustration according to FIGS. 5 and 6, whereas the main damping valve 107*b* is arranged below the dividing wall 113 and directly below the main damping valve 106*b* in the illustration according to FIGS. 5 and 6. The main damping valves 106*b*, 107*b* in each case comprise respective valve bodies corresponding to valve bodies 14 and 15 described with respect to FIGS. 1 and 2, which interact with respective cylindrical parts of deflection elements corresponding to deflection elements 36 described with respect to FIGS. 1 and 2. Furthermore, the main damping valve 106*c* is arranged above the dividing wall 113 in the illustration according to FIGS. 5 and 6, whereas the main damping valve 107*c* is arranged below the dividing wall 113 and directly below the main damping valve 106*c* in the illustration according to FIGS. 5 and 6.

As illustrated in FIGS. 3-6, the outer damper tube 101, piston rod 102, working piston 103, dividing piston 105, and separating tube 132 may extend, move longitudinally, and/or translate relative to one another along a first common longitudinal axis. The main damping valves 106*a* and 107*a*, and components thereof, may also extend, and fluid may flow therethrough, along a second common longitudinal axis. The main damping valves 106*b* and 107*b*, and components thereof, may also extend, and fluid may flow therethrough, along a third common longitudinal axis. The main damping valves 106*c* and 107*c*, and components thereof, may also extend, and fluid may flow therethrough, along a fourth common longitudinal axis. The first, second, third, and fourth common axes may all be parallel to, and offset or spaced apart from, one another. Further, the second, third, and fourth common longitudinal axes, along which main damping valves 106 and 107 are aligned, may all be aligned in a first common plane. Additionally, the first and fourth common longitudinal axes may be aligned in a second common plane, which may be perpendicular to the first common plane.

In the case of a compression phase of movement of the piston rod 102 (compression stage), that is to say if the piston rod 102 dips into the damper tube 101, the working piston 103 presses damping liquid out of the second working space 104*b* via the first flow feed line 130 and the bore 111 directly into the first hydraulic space 109 to the location of the main damping valves 106*c* and 107*c*. The damping liquid may flow through the first hydraulic space 109, such as through a first channel or manifold in the housing 108, from the location of the main damping valves 106*c* and 107*c* to the locations of the main damping valves 106*a* and 107*a* as well as 106*b* and 107*b*. The damping liquid may then flow through the main damping valves 106*a* and/or 106*b* to the second hydraulic space 110, in the manner described herein with respect to valves 6 and 7 illustrated in FIGS. 1 and 2. The damping liquid then flows through the second hydraulic space 110, such as through a second channel or manifold in the housing 108, from the location of the main damping valves 106*a* and 107*a* as well as 106*b* and 107*b* to the location of the main damping valves 106*c* and 107*c*, and then out of the second hydraulic space 110 through the bore 112 and the second flow feed line 131 into the third working space 104*c*.

In the case of a rebound phase of movement of the piston rod 102 (rebound stage), the working piston 103 presses damping liquid out of the third working space 104*c* via the second flow feed line 131 and the bore 112 directly into the second hydraulic space 110 to the location of the main damping valves 106*c* and 107*c*. The damping liquid may flow through the second hydraulic space 110, such as through a second channel or manifold in the housing 108, from the location of the main damping valves 106*c* and 107*c* to the location of the main damping valves 106*a* and 107*a* as well as 106*b* and 107*b*. The damping liquid may then flow through the main damping valves 107*a* and/or 107*b* to the first hydraulic space 109, in the manner described herein with respect to valves 6 and 7 illustrated in FIGS. 1 and 2. The damping liquid then flows through the first hydraulic space 109, such as through the first channel or manifold in the housing 108, from the location of the main damping valves 106*a* and 107*a* as well as 106*b* and 107*b* to the location of the main damping valves 106*c* and 107*c*, and then out of the first hydraulic space 109 through the bore 111 and the first flow feed line 130 into the second working space 104*b*. The dividing wall 113 separates the two hydraulic spaces 109, 110 from one another hydraulically.

As illustrated in FIG. 5, the first hydraulic space 109 and the second hydraulic space 110 have respective openings extending through an outer wall of the housing 108 at the left side in the Figure. These openings are present to allow the hydraulic spaces 109 and 110 to be drilled into the side of the housing 108 and can allow other components to be inserted into and mounted within the housing 108 during manufacture. These openings are then plugged, closed, and/or sealed at a later stage in manufacturing and prior to operation.

As described elsewhere herein, the main damping valves 106*a*, 106*b*, 107*a*, and 107*b* are independently- and continuously-adjustable main damping valves, while the main damping valves 106*c* and 107*c* are passive, non-adjustable main damping valves. In some embodiments, the main damping valves 106*a*, 106*b*, 107*a*, and 107*b* may provide soft performance characteristics relative to the main damping valves 106*c* and 107*c*, and the main damping valves 106*c* and 107*c* may provide hard performance characteristics relative to the main damping valves 106*a*, 106*b*, 107*a*, and 107*b*. Thus, for example, the main damping valves 106*c* and 107*c* can function as relief check valves that can allow additional damping liquid to pass through the piggyback valve 118 under extreme loading conditions, such as to reduce the likelihood of, or prevent, damage to the adjustable main damping valves 106*a*, 106*b*, 107*a*, and 107*b* in such extreme conditions.

Providing four independently- and continuously-adjustable main damping valves, as described herein for vibration damper 100, rather than two, as described with respect to FIGS. 1 and 2, provides certain advantages, including more responsive dynamic performance of the system.

In some embodiments, the main damping valves 106*a*, 106*b*, 107*a*, and 107*b* are identical to one another. In other embodiments, they are different from one another. For example, some of the main damping valves 106*a*, 106*b*, 107*a*, and 107*b* may be normally open (NO) while others are normally closed (NC). For example, in one embodiment, the main damping valves 106*a* and 106*b* are NO while the main damping valves 107*a* and 107*b* are NC. In another embodiment, the main damping valves 106*a* and 106*b* are NC while the main damping valves 107*a* and 107*b* are NO. In another embodiment, the main damping valves 106*a* and 107*a* are NO while the main damping valves 106*b* and 107*b* are NC. In another embodiment, the main damping valves 106*a* and 107*b* are NO while the main damping valves 106*b* and 107*a* are NC. In another embodiment, exactly one of the main damping valves 106*a*, 106*b*, 107*a*, and 107*b* is NC. In another embodiment, exactly one of the main damping valves 106*a*, 106*b*, 107*a*, and 107*b* is NO.

As another example, some of the main damping valves 106*a*, 106*b*, 107*a*, and 107*b* may have softer or harder performance characteristics relative to one another. For example, in one embodiment, the main damping valves 106*a* and 106*b* have soft performance characteristics relative to the main damping valves 107*a* and 107*b*. In another embodiment, the main damping valves 106*a* and 106*b* have hard performance characteristics relative to the main damping valves 107*a* and 107*b*. In another embodiment, the main damping valves 106*a* and 107*a* have soft performance characteristics relative to the main damping valves 106*b* and 107*b*. In another embodiment, the main damping valves 106*a* and 107*b* have hard performance characteristics relative to the main damping valves 106*b* and 107*a*. In another embodiment, exactly one of the main damping valves 106*a*, 106*b*, 107*a*, and 107*b* has hard performance characteristics relative to the others. In another embodiment, exactly one of the main damping valves 106*a*, 106*b*, 107*a*, and 107*b* has soft performance characteristics relative to the others. Such performance characteristics can be achieved by suitable adjustment of valve disc (shim) stack-up configurations of the respective main damping valves.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise herein. It will also be understood that the description, including disclosed examples and drawings, is intended for purposes of illustration only and is not intended to limit the scope of the present disclosure, its application or uses. Thus, variations that do not depart from the gist of the present disclosure are intended to be within the scope of the present disclosure.

What is claimed is:

1. A hydrostrut, comprising:

a damper tube filled at least partially with a damping liquid;

a hollow piston rod configured to move longitudinally in the damper tube;

a working piston that is attached to the hollow piston rod;

first and second damping valves, wherein each of the first and second damping valves is configured to provide an independently-adjustable damping force, wherein the damping liquid passes through the first damping valve when the hollow piston rod moves into the damper tube and the damping liquid passes through the second damping valve when the hollow piston rod moves longitudinally out of the damper tube, wherein each of the first and second damping valves comprises a valve body that is movable between a closed position and an open position to set a throughflow cross section of the respective damping valve, wherein each valve body is independently positionable by an independently-controllable drive device;

compressed nitrogen gas within a working space inside the hollow piston rod; and a dividing piston inside the hollow piston rod, wherein the dividing piston is configured to translate longitudinally along the length of the hollow piston rod such that the dividing piston travels toward the working space when the hollow piston rod moves longitudinally into the damper tube, thereby compressing the nitrogen gas in the working space, and such that the dividing piston travels away from the working space when the hollow piston rod moves out of the damper tube, thereby expanding the nitrogen gas in the working space.

2. The hydrostrut of claim 1, wherein the first and second damping valves are electromagnetically-operable, continuously-adjustable damping valves.

3. The hydrostrut of claim 1, wherein the first and second damping valves are arranged in a piggyback valve housing.

4. The hydrostrut of claim 3, wherein the piggyback valve housing has a flat, milled flange and screw holes through which screws can extend to couple the piggyback valve housing to the damper tube.

5. The hydrostrut of claim 3, wherein the working space is a fourth working space and the hydrostrut further comprises a first working space inside the hollow piston rod, wherein the fourth working space is separated from the first working space by the dividing piston, a second working space outside of and adjacent to the hollow piston rod in a longitudinal direction, wherein the second working space is hydraulically coupled with the first working space directly through the working piston, and a third working space outside of and adjacent to the hollow piston rod in a radial direction, wherein the third working space is hydraulically coupled with the second working space directly through the first and second damping valves.

6. The hydrostrut of claim 5, wherein movement of the hollow piston rod into the damper tube causes the damping liquid to flow from the second working space toward the first damping valve and movement of the hollow piston rod out of the damper tube causes the damping liquid to flow from the third working space toward the second damping valve.

7. A vibration damper for a motor vehicle, comprising:

a damper tube filled at least partially with damping liquid;

a piston rod that is configured to move longitudinally in the damper tube;

a working piston that is attached to the piston rod; and first, second, third, and fourth adjustable damping valves, wherein each of the adjustable damping valves is configured to provide an independently-adjustable damping force, wherein the damping liquid passes through the first and second adjustable damping valves when the piston rod moves longitudinally into the damper tube and the damping liquid passes through the third and fourth adjustable damping valves when the piston rod moves longitudinally out of the damper tube, wherein each of the adjustable damping valves comprises a valve body that is movable between a closed position and an open position to set a throughflow cross section of the respective damping valve, wherein each valve body is independently positionable by an independently-controllable drive device.

8. The vibration damper of claim 7, further comprising:

first and second passive, non-adjustable damping valves configured such that the damping liquid can pass through the first passive damping valve when the piston rod moves longitudinally into the damper tube and the damping liquid can pass through the second passive damping valve when the piston rod moves longitudinally out of the damper tube.

9. The vibration damper of claim 8, wherein the damper tube, the piston rod, and the working piston are arranged along a first common axis, the first and third adjustable damping valves are arranged along a second common axis, the second and fourth adjustable damping valves are arranged along a third common axis, and the first and second passive damping valves are arranged along a fourth common axis, wherein the first, second, third, and fourth common axes are parallel to and spaced apart from one another.

10. The vibration damper of claim 9, wherein the second, third, and fourth common longitudinal axes are all aligned in a first common plane.

11. The vibration damper of claim 10, wherein the first and fourth common longitudinal axes are arranged in a second common plane that is perpendicular to the first common plane.

12. The vibration damper of claim 8, wherein the first and second passive damping valves provide relatively hard performance characteristics relative to the first, second, third, and fourth adjustable damping valves.

13. A motor vehicle, comprising:

a first hydrostrut, including:

a first damper tube filled at least partially with a first damping liquid;

a first hollow piston rod configured to move longitudinally in the first damper tube;

a first working piston that is attached to the first hollow piston rod;

first and second damping valves, wherein each of the first and second damping valves is configured to provide an independently-adjustable damping force, wherein the first damping liquid passes through the first damping valve when the first hollow piston rod moves longitudinally into the first damper tube and the first damping liquid passes through the second damping valve when the first hollow piston rod moves longitudinally out of the first damper tube, wherein each of the first and second damping valves comprises a respective valve body that is movable between a closed position and an open position to set a throughflow cross section of the respective damping valve, wherein each valve body is independently positionable by an independently-controllable drive device;

compressed nitrogen gas within a first working space inside the first hollow piston rod; and a first dividing piston inside the first hollow piston rod, wherein the first dividing piston is configured to translate longitudinally along the length of the first hollow piston rod such that the first dividing piston travels toward the first working space when the first hollow piston rod moves longitudinally into the first damper tube, thereby compressing the nitrogen gas in the first working space, and such that the first dividing piston travels away from the first working space when the first hollow piston rod moves out of the first damper tube, thereby expanding the nitrogen gas in the first working space; and a second hydrostrut, including:

a second damper tube filled at least partially with a second damping liquid;

a second hollow piston rod configured to move longitudinally in the second damper tube;

a second working piston that is attached to the second hollow piston rod;

third and fourth damping valves, wherein each of the third and fourth damping valves is configured to provide an independently-adjustable damping force, wherein the second damping liquid passes through the third damping valve when the second hollow piston rod moves longitudinally into the second damper tube and the second damping liquid passes through the fourth damping valve when the second hollow piston rod moves longitudinally out of the second damper tube, wherein each of the third and fourth damping valves comprises a respective valve body that is movable between a closed position and an open position to set a throughflow cross section of the respective damping valve, wherein each valve body is independently positionable by an independently-controllable drive device;

compressed nitrogen gas within a second working space inside the second hollow piston rod; and a second dividing piston inside the second hollow piston rod, wherein the second dividing piston is configured to translate longitudinally along the length of the second hollow piston rod such that the second dividing piston travels toward the second working space when the second hollow piston rod moves longitudinally into the second damper tube, thereby compressing the nitrogen gas in the second working space, and such that the second dividing piston travels away from the second working space when the second hollow piston rod moves out of the second damper tube, thereby expanding the nitrogen gas in the second working space.

14. The motor vehicle of claim 13, wherein the compressed nitrogen gas within the first working space inside the first hollow piston rod is fluidically coupled with the compressed nitrogen gas within the second working space inside the second hollow piston rod.

* * * * *